United States Patent
Hsu

(10) Patent No.: US 9,090,985 B2
(45) Date of Patent: Jul. 28, 2015

(54) STRIPPING GOLD COMPONENTS AND THE METHOD OF STRIPPING GOLD

(75) Inventor: Ching-Hsiang Hsu, Keelung (TW)

(73) Assignee: UWIN NANOTECH CO., LTD., Keelung (TW)

( * ) Notice: Subject to any disclaimer, the term of this patent is extended or adjusted under 35 U.S.C. 154(b) by 455 days.

(21) Appl. No.: 13/457,970

(22) Filed: Apr. 27, 2012

(65) Prior Publication Data

US 2012/0292201 A1    Nov. 22, 2012

(30) Foreign Application Priority Data

May 18, 2011 (TW) .............................. 100117510 A

(51) Int. Cl.
| | | |
|---|---|---|
| *C25F 3/02* | (2006.01) | |
| *C25F 5/00* | (2006.01) | |
| *C25F 3/22* | (2006.01) | |
| *C22B 3/00* | (2006.01) | |

(52) U.S. Cl.
CPC ................. *C25F 5/00* (2013.01); *C22B 11/042* (2013.01); *C25F 3/02* (2013.01); *C25F 3/22* (2013.01); *Y02W 30/54* (2015.05)

(58) Field of Classification Search
CPC .............................. C25F 3/00–3/30; C25F 5/00
USPC .................................................. 205/640–686
See application file for complete search history.

(56) References Cited

U.S. PATENT DOCUMENTS

| | | | | |
|---|---|---|---|---|
| 2,185,858 | A * | 1/1940 | Mason ........................... | 205/571 |
| 4,606,797 | A * | 8/1986 | Taylor et al. .................... | 205/567 |
| 4,663,005 | A * | 5/1987 | Edson ............................ | 205/676 |
| 6,203,690 | B1 * | 3/2001 | Findeis et al. ................. | 205/683 |
| 7,384,534 | B2 * | 6/2008 | Sun et al. ....................... | 205/684 |
| 2005/0233578 | A1 * | 10/2005 | Jia et al. ......................... | 438/633 |
| 2008/0067077 | A1 * | 3/2008 | Kodera et al. .................. | 205/645 |

OTHER PUBLICATIONS

Baume Scale: http://www.ilpi.com/msds/ref/baumescale.html, last modified Apr. 26, 2010.*

* cited by examiner

*Primary Examiner* — Nicholas A Smith
*Assistant Examiner* — Brian W Cohen
(74) *Attorney, Agent, or Firm* — McClure, Qualey & Rodack, LLP

(57) ABSTRACT

The invention provides a stripping gold component which could remove gold from substrate, comprising: a stripping gold chemical compound; and a assistant conductive compound wherein said stripping gold chemical compound bonds with gold to form covalent bond to strip gold from said substrate, said assistant conductive chemical compound helps the electric conduction and decreases the voltage, said substrate would not be damaged after stripping gold from said substrate, and the stripping gold component is cyanide free.

3 Claims, No Drawings

STRIPPING GOLD COMPONENTS AND THE METHOD OF STRIPPING GOLD

FIELD OF THE INVENTION

This invention relates to a new gold stripper and its application, particularly to provide it to electronic and waste & recycling industry field.

BACKGROUND OF THE INVENTION

With the development of electronic industry, electronic waste recycle industry is taken more seriously than ever. Many companies invest more capital, in order to enhance the efficiency of recycled metal, and its purity. For the recovery of noble metals, such as gold-plated printed circuit board, gold finger, FPC, lead frames, and components, etc., the gold can be recovered and re-used.

As is well known, gold is one of the noble metal with high chemical resistance. It is not easy to dissolve or corrosion by acid or alkaline solution. Therefore, the traditional stripping gold (or gold dissolution) technology can only be applied by using aqua regia or cyanide. The main processes as following:

For aqua regia, its advantages may be considered as easy to prepare, and could dissolve most of metals. However, with its strong corrosive, the potential risk is quite huge for all operators. Protective equipment need to be applied mostly.

On the other hand, using cyanide as gold stripper, unfortunately, always produces cyanide-containing waste, which contains huge wastewater, high cyanide content, and few amount of heavy metals. The waste water must to be diluted 500 times before its recycle process, so it actually increases water consumption and operation cost. Besides, few amounts of heavy metals cannot be recycled as mixed sludge. Especially, in the stripping processing, it is easy to produce cyanide with volatile and toxicity. When cyanide contacts skin, it will prevent oxygen exchange of human tissue cells, resulting in cell death. Therefore, it is very harmful to heart and brain. The cyanide is regulatory in nature highly toxic substances, and it may harm the operator by the slightest mistake.

Besides the damages of human body as we applied above, the gold stripping methods by using aqua regia or cyanide-based chemical components would also damage the electronic parts as connector's substrate, especially would he completely destroyed by aqua regia. This phenomenon makes the re-work of defectiveness become impossible. Although the gold from those electronic, parts can be recycled, the rest of parts of these products have to be re-manufactured. In addition, those two existing gold strippers not only need to be improved of their reaction rate, but also the amount of gold dissolution.

In summary, this invention attempts to provide a non-cyanide gold stripping technology, which owns especial characteristics as environment friendly, human body safety, better gold stripper rate and dissolution amount, compared to aqua regia or any cyanide-based chemical component.

BRIEF SUMMARY OF THE INVENTION

It is an aspect of the invention to provide a stripping gold component for stripping gold.

It is a further aspect of the invention to provide a stripping gold component for stripping gold from the substrate of electronic parts.

It is another aspect of the invention to provide a method for stripping gold from the substrate.

The invention provides a compound which could strip the gold from the substrate of electronic parts. This compound may consist of one or several stripping gold chemicals, and a conducting chemical. For it phenomenon, the stripping gold compounds could form a covalent bond with Au and then bring the gold from the surface of substrate. And with the assistance of conducting chemical, the working voltage could be controlled as low as no damage to substrate. Cyanide-based chemical is not included.

The invention also provides the stripping process from the substrate of electronic parts. The steps includes; dissolving stripping gold component into pure water; putting a substrate which has plated by gold into the solution, wherein the substrate connects with anode; applying voltage between 0.1~4.0 to start the process; and stirring the solution in order to get better result.

The stripping gold component of the invention can quickly strip gold, and the substrate will not be damaged after all process. It does not bring any waste, and certainly not affect the operator or the environment.

BRIEF DESCRIPTION OF THE SEVERAL VIEWS OF THE DRAWINGS

Detailed Description of the Invention

Reference will now be made in detail to the present embodiments of the invention.

The invention relates to stripping gold components and its application, and particularly to provide stripping gold components for stripping gold from the substrate and the method thereof.

The invention provides a compound which could strip the gold from the substrate of electronic parts. This compound may consist of one or several stripping gold chemicals, and a conducting chemical. For it phenomenon, the stripping gold compounds could form a covalent bond with Au and then bring the gold from the surface of substrate. And with the assistance of conducting chemical, the working voltage could be controlled as low as no damage to substrate. Cyanide-based chemical is not included.

In one embodiment, the stripping gold chemical compound comprises a thiocarbamide. Besides, the stripping gold chemical compound could further comprises alkyl sulfate compound, pyridine sulfonic acid compound and triglycine compound. On the other hand, the stripping gold chemical compound could be selected from an alkyl sulfate compound and a pyridine sulfonic acid compound.

In another embodiment, the stripping gold chemical compound could also be selected from sulfite, sulfate, and over sulfate. Further, the stripping gold chemical compound could choose $FeSO_4$. The stripping gold chemical compound could be selected from organic sulfonic acid, such as methane sulfonic acid, ethane sulfonic acid, propane sulfonic acid. Furthermore, suitable compound would be selected for different substrate, such as nitrobenzene compound. For example, nitrobenzene carboxylic acid, alkali metal salts of nitrobenzene carboxylic acid, alkaline-earth metal salts of nitrobenzene carboxylic acid.

In one embodiment, the helping conducting chemical compound is selected from citrate, oxalate, and malate. Take citrate for example, tripotassium citrate monohydrate could be selected. Besides, the helping conducting chemical compound could be selected from boric acid, sodium hydroxide, potassium hydroxide. In a better embodiment, the helping conducting chemical compound is selected from sodium, ammonium sulfate, potassium sulfate, sodium chloride, ammonium chloride, potassium chloride, ammonium nitrate, potassium ammonium, sodium ammonium. In another better embodiment, the helping conducting chemical compound is selected from dipotassium hydrogen phosphate, and potassium dihydrogen phosphate.

Specifically, die composition of the stripping gold component in the present invention dose not include lead (Pb), cadmium (Cd), mercury (Hg), hexavalent chromium (Cr6+) and bromine (Br) elements. Besides, chromate compound will not be selected. Moreover, the composition of the stripping gold component in the present invention also not contains sulfuric acid or hydrochloric acid and other chemical substances.

In a better embodiment, the stripping gold component for stripping gold from the substrate comprises thiocarbamide, alkyl sulfate compound, pyridine sulfonic acid compound and compound and citrate. Wherein, alkyl sulfate compound could choose sodium n-octadecyl sulfate, pyridine sulfonic acid compound could choose pyridine-3-sulfonic acid, triglycine compound could choose nitrilotriacetic acid and citrate could choose tripotassium citrate monohydrate.

The invention also provides the stripping process from the substrate of electronic parts. The steps includes, dissolving stripping gold component into pure water; putting a substrate which has plated by gold into the solution, wherein the substrate connects with anode; applying voltage between 0.1~4.0 to start the process; and stirring the solution in order to get better result.

During the process of stripping gold from the substrate the range of the solution's temperature could be 20° C.-70° C. The material of the cathode could choose from stainless steel, titanium or titanium alloy. Further, during the process of stripping gold from the substrate, the range of the baume needs to be controlled from 0.5-10. Furthermore, the substrate could include a layer of copper, nickel, aluminum or silver and other metals disposed on it, and gold is plated above the layer illustrated above, wherein the substrate may be electronic waste or PCB connector terminals and other objects.

In the step of stirring the solution, it could be performed by drum rotation. Since the greater stirring provides the better gold stripping rate, it could be performed by assembling circulating pipe to the bottom of the solution to increase the rotation. Filtration devices could be also added to avoid the loop holes clogged by impurities.

The invention of gold stripping and its application is an electrochemical process, provided electricity from outside, and let gold plating could dissolve from the anode and dissolve in the solution, and so stripping gold achieved.

Electrolysis and electroplating are the opposite processes. The electrolysis process presents the metal layers as anode, which will lose electrons from its surface, and then becomes cation.

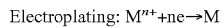

Electroplating: $M^{n+}+ne \rightarrow M$

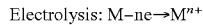

Electrolysis: $M-ne \rightarrow M^{n+}$

In this reaction, $M^{n+}$ presents value n of metal ion ne presents n numbers of electrons, and M is the recovered metal.

Gold concentration test

For the substrate recycled application, there are several methods could be applied to analyze the concentration of gold as following:

1. Equipment analysis (atomic absorption spectroscopy)

First, preparation standard solution. Take 0.5 ml stripping gold solution, and dilute to 500 ml by adding pure water and then analysize it by using atomic absorption spectrometer.

2. Combustion gravimetric method (1) Take 10 ml stripping gold solution in the conical flask.

(2) Add 50 ml of concentrated sulfuric acid into the conical flask and heat it until the solution turns to dark brown.

(3) Add 10 ml of concentrated nitric acid and heat it until the solution turns to transparent.

(4) Add 150 ml water and heat it to boil (5) Filter by filter paper.

(6) Place it to the crucible and dry out with 900.

(7) Weight and calculate the weight difference ($\Delta W$) of the crucible between before and after the crucible dry out.

(8) Calculate: $Au[g/L]=(\Delta W/\text{by taking the amount of stripping gold solution}) \times 100$ Re-processing sample for reliance test Gold layer of the corrosion test is based on the Electronic Industries Alliance EIA-364-26B. By using a 5% neutral saline. (pH 6.5~7.2, to perform spray reaction 24 hr under temperature $35 \pm 1°$ C. In accordance with EIA-364-53, $70 \pm 1\%$ of nitric acid is selected under temperature $23 \pm 2°$ C., the humidity is less than 60%, and reaction for 75 minutes. The gold layer of low-power contact resistance (Low Level Contact Resistance, LLCR) is based on EIA-364-23, and the max open circuit voltage is 20 mV. The test current is 100 mA. Impregnated with gold-plated samples in lead-free solder furnace would be performed to measure the balance of its coating of wetting (wetting balance). Wetting balance test is based on the standard U.S. military standard MIL-STD-833E, the oven test temperature is under $245 \pm 3°$ C., the immersion depth is about 2 mm, the immersion time is about 5 s, the speed of immersion and left is about 2 mm/s, and the lead-free solder furnace is the Sn-3.0 Ag-0.5 Cu system.

By using the stripping gold component of this invention to strip gold and then re-processing gold-plated for the connector terminals with failing gold-plated, it indeed through the relevant standard tests.

Cationic resin recycling equipment

Au ions with positively charged could be adsorbed effectively by Cationic resin. When the stripping gold solution become dark yellow from transparent, expresses that the Au ion concentration increases. By using the cationic resin tower to recycle Au ions, the stripping gold solution would become clear again, and the lifetime of the stripping gold solution has extended.

By using the stripping gold component of this invention, the stripping gold rate is fast and it could able to complete stripping gold plating effectively. Especially with the conductive compound, it can enhance the current conduction, reduce the required voltage so that the substrate (such as copper or nickel) will not be damaged after whole process By using the stripping gold component of this invention, it successfully creates a non-cyanide stripping gold technology to replace the existing system of the industry which often uses cyanide-base chemical. It could quickly strip the gold layer on the connector terminal by using electrolytic methods for terminal scrap gold recovery and for the re-processing gold-plated of the connector terminalls with failing gold-plated so to reach cycle (recycling) purposes.

The component of this invention completely solves the dangers of using cyanide-based chemical and aqua regia. It does not produce intradable waste while neither damages the operator or the environment.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claim.

I claim:

1. A method for stripping gold layer from a substrate, comprising steps of:

providing an electrolyzing solution without a cyanide-based chemical but having stripping gold components and at least one conducting compound to strip said gold layer from a substrate, said substrate having a copper layer formed thereon, and at least a portion of said copper layer having a nickel layer and a gold layer successively electroplated thereon and said stripping gold components being selected from the group consisting of an alkyl sulfate compound, a pyridine sulfonic acid compound, and mixtures thereof, wherein said electrolyzing solution does not contain sulfuric acid or hydrochloric acid;

putting said substrate into said electrolyzing solution wherein said substrate connects with an anode electrode;

performing an electrolyzing process to strip the gold layer without damaging the electroplated nickel layer or the copper layer therebeneath by electrolyzing with a voltage in between about 0.1-4 volt, and stirring the solution.

2. The method according to claim 1, wherein said solution is at a temperature between about 20-70° C.

3. The method according to claim 1, wherein the electrolyzing process is operated at a Baume value in between 0.5-10.

* * * * *